United States Patent [19]

Elmer

[11] 4,006,650
[45] Feb. 8, 1977

[54] INDEXING CONTROL FOR ROTATABLE PART ON A MACHINE TOOL

[75] Inventor: James W. Elmer, Anoka, Minn.

[73] Assignee: Inventors Engineering, Inc., Minneapolis, Minn.

[22] Filed: May 22, 1975

[21] Appl. No.: 580,045

Related U.S. Application Data

[62] Division of Ser. No. 424,950, Dec. 17, 1973, abandoned.

[52] U.S. Cl. .............................. 74/813 C; 74/815
[51] Int. Cl.² ...................................... B23B 29/32
[58] Field of Search ........ 74/568 M, 568 T, 568 R, 74/813 C, 815, 818

[56] References Cited

UNITED STATES PATENTS 3,795,115  3/1974  Price et al. .................. 74/813 C X
3,850,051  11/1974  Woltjen et al. .............. 74/813 C X

*Primary Examiner*—Samuel Scott
*Assistant Examiner*—F. D. Shoemaker
*Attorney, Agent, or Firm*—Dugger, Johnson & Westman

[57] ABSTRACT

A drilling machine capable of rapid change over for drilling different parts, and which has stations for simultaneously, or sequentially, drilling holes in a particular part. The unit includes means for positively positioning the part, and gripping the part, and rotating or indexing the part to different rotational positions for the drilling operation. Control means are utilized for positively and precisely positioning the part for the various drilling operations.

5 Claims, 11 Drawing Figures

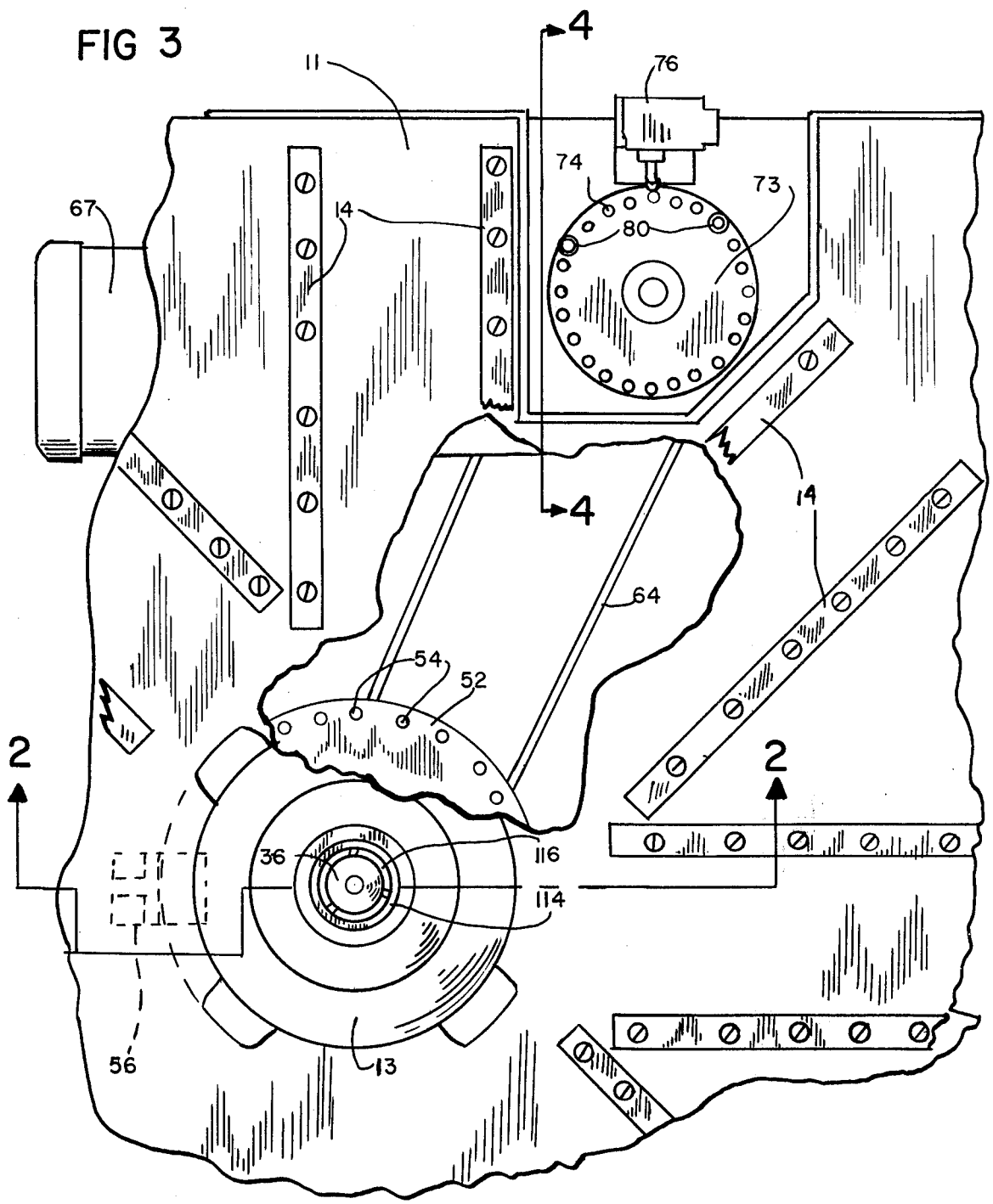

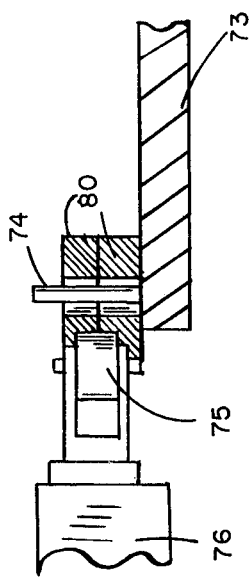
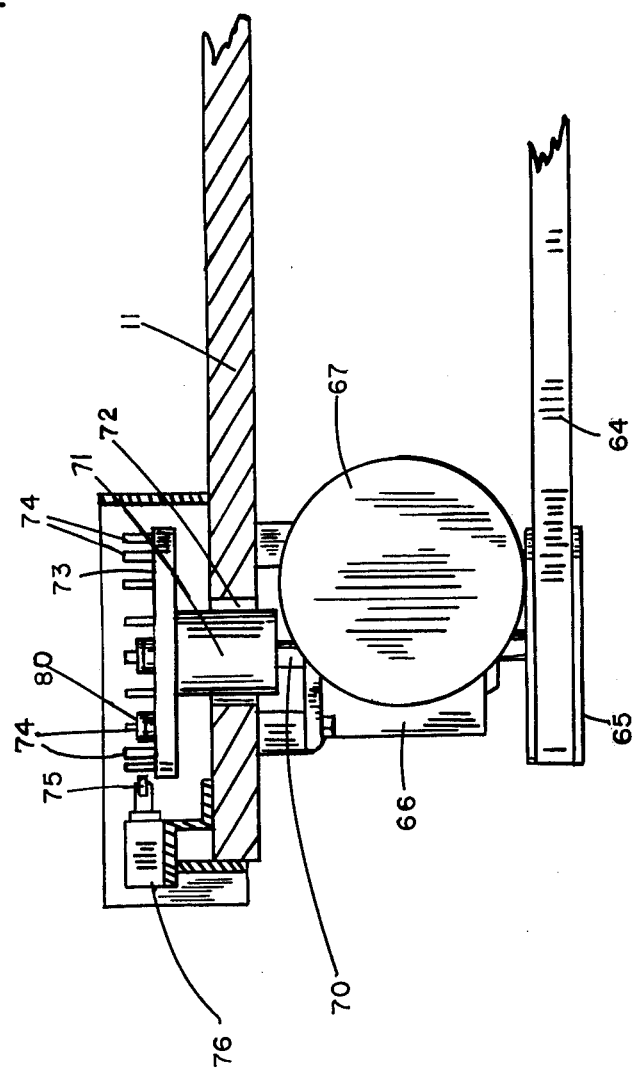
FIG 4A
FIG 4

INDEXING CONTROL FOR ROTATABLE PART ON A MACHINE TOOL

This is a division, of application Ser. No. 424,950, filed Dec. 17, 1973 now abandoned.

BACKGROUND OF THE INVENTION

1. Field of the Invention.

The present invention relates to a universal drilling machine which can be used to drill several parts with minimum changes in tooling for automating manufacture of parts without complex tooling.

2. Prior Art.

In the prior art when multiple head drilling machines are utilized, it is usually required to very precisely manufacture tooling for holding the parts, and thus a high tooling cost is encountered. Unless very high volume parts are made the tooling costs get exhorbitantly high.

SUMMARY OF THE INVENTION

The present invention relates to a machine which can be used for drilling, milling, counterboring and the like and which can be adapted to be utilized with a wide variety of different parts without expensive tooling changes. The unit can be programmed to index and drill at different locations with simple but reliable and low cost mechanical components.

One of the problems that has been encountered in attempting to automate multiple hole drilling with multiple indexing of the parts is that the holders for the parts generally require the part to be moved when it is chucked. In a tool setup, the movement of the part during the chucking operation causes disruption of the position of the part with respect to the drills, so that interchangeability of parts has become a problem. Thus, complex tooling is usually developed for high production drilled parts, and even with complex tooling the precise location of the multiple holes where the part has to be rotated between drilling operations is difficult. The present invention comprises a machine which has a base that provides means for mounting up to eight stations radially around a center post. The stations will mount normal motor driven drills of conventional design which can be moved axially along their axis of rotation toward and away from the part in the center of the unit. Supports are also provided which permit the drills to be moved up and down, and also to be angled with respect to the central axis of the part.

The center portion of the machine includes a chuck which has an internal shoulder for positively positioning the part to be drilled, and which clamps the part after positioning against the shoulder without moving the part. This precisely holds the part with respect to the drills that are set up so that the operation of the drills is repeatable for different parts.

The rotation or indexing of the parts so different positions for different drilling operations is also accomplished with very precise, easily changed tooling that permits rotation of the chuck to any one of a number of selected rotational positions that can be separately and easily programmed and interchanges with precise positioning of the part by a separate shot pin and bushing arrangement entering an opening in a dial plate that rotates with the chuck. Further, a mechanical, programmable cam control for sequencing the operation of the unit and the drilling of each of the parts is provided. The cam control is made to have easy adjustment for each of the operations, so that the proper sequencing and timing can be obtained.

The drills have suitable limit switches to sense completion of their strokes outwardly during the drilling stroke and also include limit switches for checking the return stroke of the drills to make sure that the drills have been moved all the way back to retracted position and thus withdrawn from the part before the part is rotated or indexed by the indexing mechanism. The mechanical programmer is easily changed when different parts are run and when different operations are required.

The unit is thus easily made to accommodate different types of parts which require multiple holes or operation to provide high production drilling operations.

The chuck provides for precisely positioning the part to be machined or drilled with respect to a fixed support. The chuck is supported on the same base on which the machines (drills as shown) being used are mounted. The chuck can be used with other types of machine tools such as counterboring devices, mills and the like.

BRIEF DESCRIPTION OF THE DRAWINGS

FIG. 3 is a fragmentary top plan view of the support for the machine showing the indexing programmer used for rotating the piece part between preselected positions during the drilling operation;

FIG. 4 is a vertical sectional view taken as on line 4—4 in FIG. 3;

FIG. 4A is a fragmentary enlarged view of a portion of the device of FIG. 4;

DESCRIPTION OF THE PREFERRED EMBODIMENT

Figure 1:
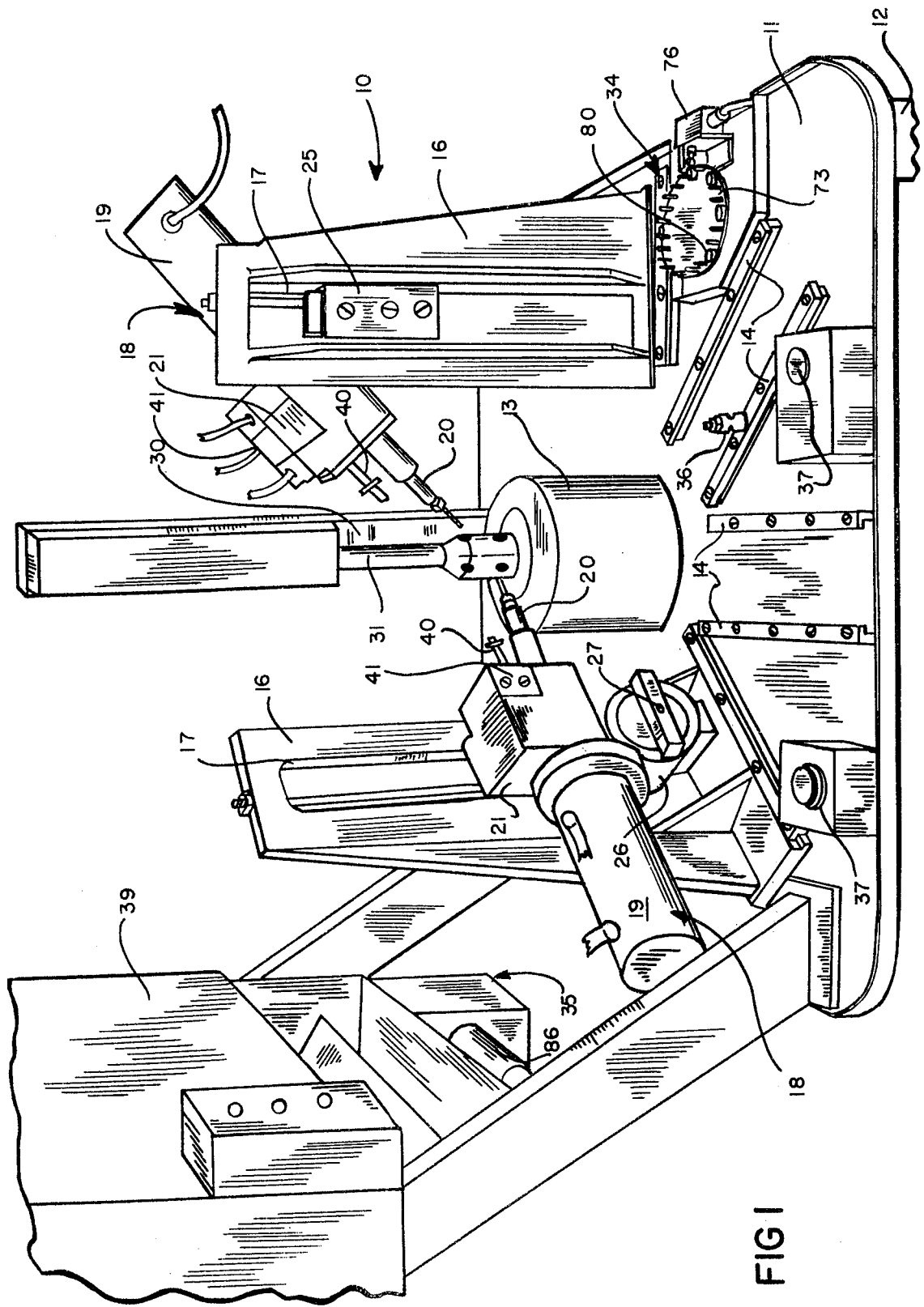
FIG. 1 is a perspective view of a drilling machine made according to the present invention showing a part in position to be drilled.

A drilling machine illustrated generally at 10 comprises a base 11 that is mounted on suitable legs shown only fragmentarily at 12 so that the position of the base above the surface of the floor a desired amount, and as shown base 10 is a flat table provided with various work stations, and a center work housing illustrated generally at 13.

Each of the work stations comprises a pair of guide rails 14, 14 that are spaced apart, and are used for mounting work supports and members. For example, the stations can mount upright frames 16 that have vertical guides 17 on which conventional power operated drilling head units 18 are mounted. The drilling head units include pneumatic cylinders 19 for moving a drill spindle 20 axially inwardly and outwardly along the cylinder, and electric motors 21 which will rotate the spindles and drive the drills or tools carried thereby in a rotary direction for the drilling operation. As shown, the guides 17 are made to receive adjustable clamp blocks 25 that clamp the drilling head assemblies in position on the support, at any desired position. As shown, the adjustment blocks 25 are at an opposite end of a housing 26 that provides for rotation of the drilling heads about an axis indicated at 27 positioned at right angles to the direction of movement along the supports 17. The angle of the drilling heads can be varied from a position as shown in FIG. 1 substantially 45° to the horizontal, to a horizontal position as shown on the left portion of FIG. 1.

The central work housing 13 includes a chuck on the interior thereof for holding a work piece, and as shown, an upright support 30 can be attached to the base 11 with a vertically movable drill bushing 31 housing which will cover a work piece as shown in FIG. 1 and includes properly located drill bushings so that when the drills carried by spindles 20 engage the work piece, the bushings will be in place over the work piece and the work piece will be held in position. The bushing support is clamped with a linear actuator on the support 30 against the housing 13. The actuator also is used for retracting the bushing holder when the part has been finished.

The work piece within the housing 13 is rotatable for indexing about a vertical axis at the center of the plate 11, and the indexing rotation of the part can be controlled by a simplified position controller illustrated generally at 34 that is mounted on the plate 11, and will be more fully explained. A mechanical programming cam assembly is mounted in the housing 35 to control the operations of the drilling head, and the various components of the machine as will be more fully explained.

As shown, there are eight work stations on the plate 11 located radially around the central upright axis on which the work piece is centered, and this permits up to eight different operations to be performed at once, one at each of the work stations. As shown, the drills are set up to drill one hole into a piece part at 45° to the horizontal, and one hole which is horizontal. The part can be indexed, the drills restarted and in this way, by indexing several times, any number of holes may be drilled in the part.

Typical piece parts are illustrated generally at 36, in FIG. 1 and are parts that are held about an upright axis for the drilling operation. On and off switches indicated generally at 37 are provided for the operator, and as will be more fully explained these switches will initiate a cycle of operation which will, once initiated automatically perform the required operations on piece part 36. The programmer is designed to stop the operating cycle when complete so that the piece part in housing 13 can be removed from the chuck and a new piece part that has not been drilled put into place.

A power source indicated at 39 can be used for controlling electrical power, and suitable motors of course will be driving all of the units.

The adjustable actuators shown at 40 in FIG. 1 on the drilling head 13 are used for actuating suitable limit switches shown generally at 41 on each of the heads to indicate when the drill is at its fully retracted position, and also limit switches are used to indicate when the drill is at its fully extended position or has completed its drilling cycle. In this way, the movement of the drill axially along the axis of the cylinders 19 can be controlled, and movement of the piece part being drilled will be governed by the position of the drill heads to make sure that the drill heads are properly retracted from the part before the part is moved, and also to make sure that the drill has completed a full stroke so that they are properly seated during the drilling operation.

The drill heads cylinder 19 are controlled by suitable solenoid valves of the type which, when energized momentarily, will remain in the position to which they are moved until a reverse signal is given for example, if an electrical signal is given and the valves are moved to extend the cylinders 19 the valve will stay, in that position even if the electrical signal is removed, until a new signal is provided to the valve to move it to its opposite position. Thus once the drills are started toward the work piece, then the spindles will extend until the actuator trips the limit switch showing that the drill has extended fully and then it will reverse and retract.

Figure 2:
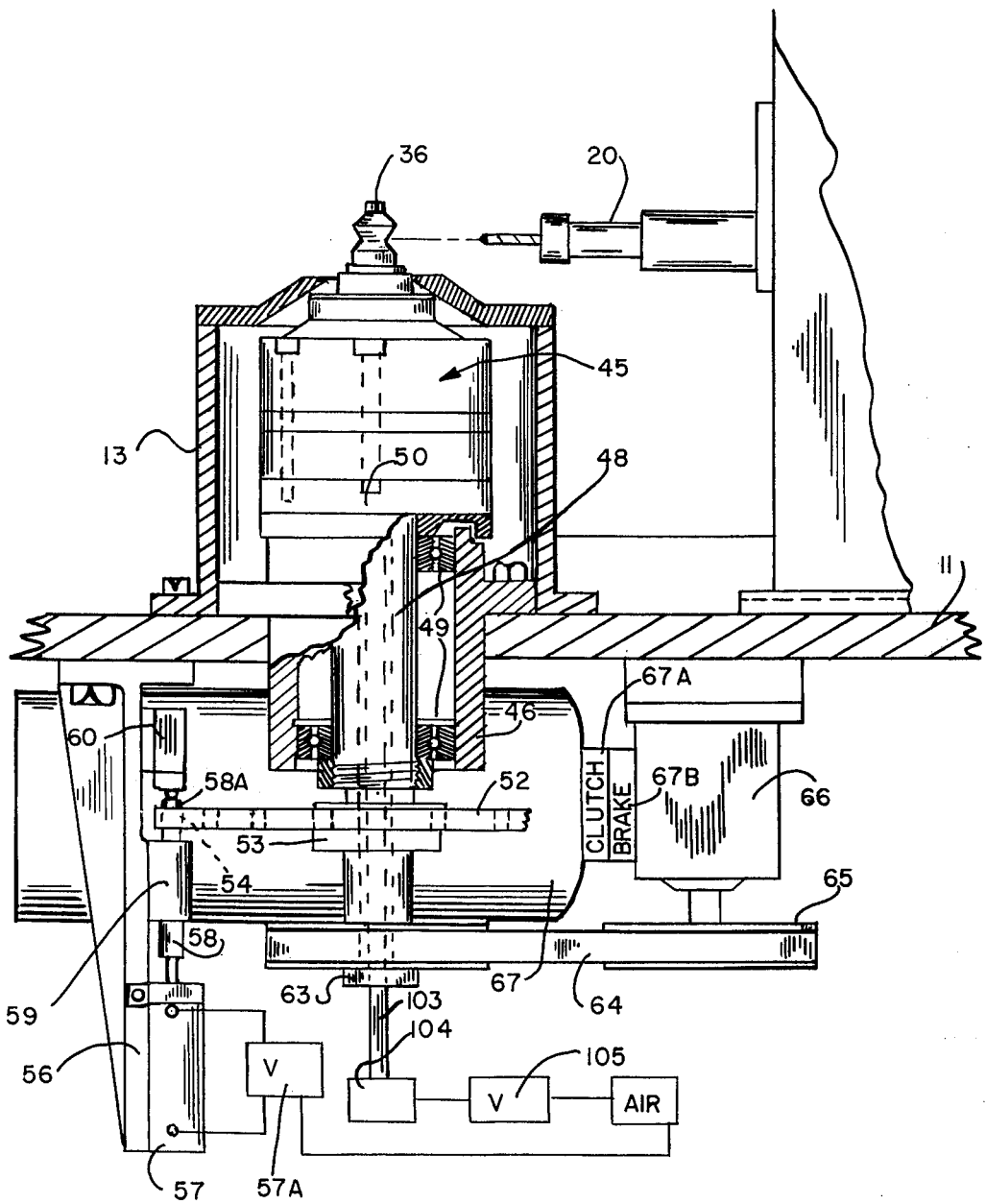
FIG. 2 is a vertical sectional view of a portion of the support and mounting member for indexing the piece part and a chuck for holding the part and taken on line 2 — 2 in FIG. 3.

In FIG. 2, the table 11 is shown in Fragmentary sectional view adjacent the center of the table, and the work housing 13 is also shown. The work piece 36 is shown positioned in the unit that supports the work, and this comprises a collet member 45 illustrated generally without detail in FIG. 2. The table or base 11 supports a bearing housing 46 at the center portions thereof through a provided opening 47 in the table, and this bearing housing rotatably mounts a shaft 48 on suitable bearings 49, 49 at opposite ends thereof. The shaft has a head 50 affixed thereto, and the head 50 is used for supporting and drivably mounting the collet 45. Suitable cap screws clamp the collet to the head. At the lower portions of the shaft 48, below the bearing housing 46, there is drivably mounted a dial plate 52 onto the shaft. This dial plate is supported with a suitable hub 53. The dial plate is an annular disc with a plurality of apertures 54 extending therethrough adjacent the outer periphery thereof.

A depending support leg 56 is mounted to the lower surface of the base 11. This leg 56 in turn mounts a pneumatic double acting cylinder 57 that controls a shot pin 58 that is slidably mounted in a housing 59 which is also attached to the leg 56. The housing 39 may be cast integrally with the leg 56. The shot pin 58 is slidably mounted for movement in vertical direction in the housing, and it is positioned to be aligned with the apertures 54 of the dial plate, so that in desired rotational positions of the dial plate the shot pin is coaxial with one aperture 54. The apertures 54 are positioned fifteen degrees apart around the edge of the dial plate.

As shown, the shot pin 58 can be moved up into the aperture 54 to positively hold the dial plate 52 from rotation by operation of cylinder 57, and thus also hold the shaft 48 precisely and prevent any rotation of the workholder or collet 45. The shot pin 58 extends a sufficient distance through the dial plate so that an end portion 58A of the shot pin will contact a micro switch 60 that is positioned above the shot pin so that it is known when the shot pin has reached its home position. This indication signal is used as a control signal to indicate that the dial plate is securely held from rotation and the part is in a known position.

The cylinder 57 is a pneumatic cylinder operated through a suitable solenoid valve 57A that is controlled by suitable micro switches. The valve 57A is the type which when it is not energized, will move to a position that supplies fluid under pressure to cylinder 57 to extend the cylinder. The control signal is used to supply power to move the the valve to its opposite position and it is held the opposite position only while recieving a signal. Thus, the valve 57A will normally hold the shot pin home, but when powered, will retract the pin.

The shaft 48 also has a driven pulley 63 drivably mounted thereon below the dial plate 52, and this pulley 63 is a timing belt pulley or in other words a positive drive pulley that cooperated with a timing belt 64 so there can be no slipping between the belt and the pulley 63. This could be a timing chain drive if desired, but a belt has proved to be satisfactory because there will be no slippage. The belt 64 is driven from a drive pulley 65 on the output shaft of a right angle gear box 66 that is driven from a motor 67 through a clutch 67A and brake 67B shown in FIG. 2 only schematically. The motor 67 does not drive the gear box 66 unless the clutch is energized and the brake released. When the clutch is released the brake is energized, and when the clutch is energized, the brake releases.

The gear set has a double ended output shaft, and the lower portion of the shaft mounts the pulley 65 for the timing belt. The output shaft of gear reducer 66 also operates the index controller 34. An upwardly extending shaft portion (see FIG. 4) indicated at 70 has a hub 71 drivably mounted thereon, and the hub 71 extends through a provided opening 72 in the plate 11, to position above the surface of the plate. The hub 71 mounts a plate or disc 73 thereon, and the plate has a plurality of evenly spaced upright pegs or pins 74 extending upwardly therefrom. The plate 73 rotates about the axis of the shaft 70, and as it rotates the pegs will move past a roller 75 on the actuating arm of a micro switch 76. Each of the pegs, as shown, is spaced 15° apart around the plate 73 and as can be seen the roller 75 will clear the pegs unless there is a small washer or actuating cam disc 80 mounted over a particular peg 74. Thus, when the motor 67 is running, and the clutch 67A is energized and the brake 67B is released, the disc 73 will be rotated as will the dial plate 52. The micro switch 76 is used for deenergizing the clutch 67A and energizing the brake 67B on the output of the motor 67 when one of the actuating discs 80 contacts the micro switch 76 after the clutch 1 has once been engaged and gear box 66 driven. It should be noted that the motor, and the clutch brake assembly are well known, for example a clutch-brake assembly made by Horton Manufacturing Company, their model MDB-625, Product No. 9289 has been found to be satisfactory.

In FIG. 4A an enlarged view of the actuating mechanism for the controller is shown. The rotating plate 73 is shown fragmentarily, and a peg 74 is shown with two of the actuating cam discs 80 in place. It can be seen, that when these cam discs reach the roller 75 of the micro switch 76, they will strike this roller because they are protruding outwardly beyond the edge of the plate 73, and are in a position where they will intercept the roller 74. This can also be seen in FIG. 3, in the top view. These small discs 80 are removable and can be put on desired pegs to control indexing movement of the work piece. Usually two cam discs 80 are placed on each of the pegs 74 that are used for indexing control. As can be seen the pegs are spaced at 15° intervals around the periphery of the plate 73, and thus correspond in angular spacing to the openings 54 in the dial plate 52.

Clutch 67A can again be engaged, and the brake released independently of the switch 76 in response to an independent signal when the part being machined is to be indexed, and then it will stop again when the discs 80 on a particular spindle 74 contact the switch roller 75 again. The controls of the clutch and brake are controlled through pulse or one shot controls so they are actuated in one way (for example clutch on and brake off) and remain they way until a pulse to move them in opposite mode is received.

Figure 7:
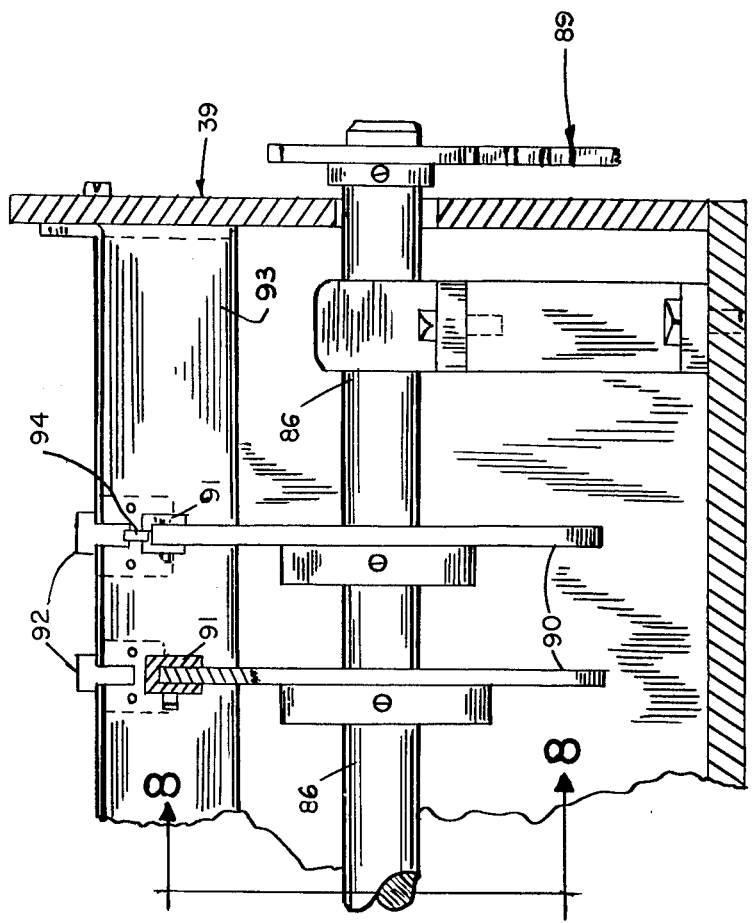
FIG. 7 is a view taken as on line 7—7 in FIG. 6.
Figure 6:
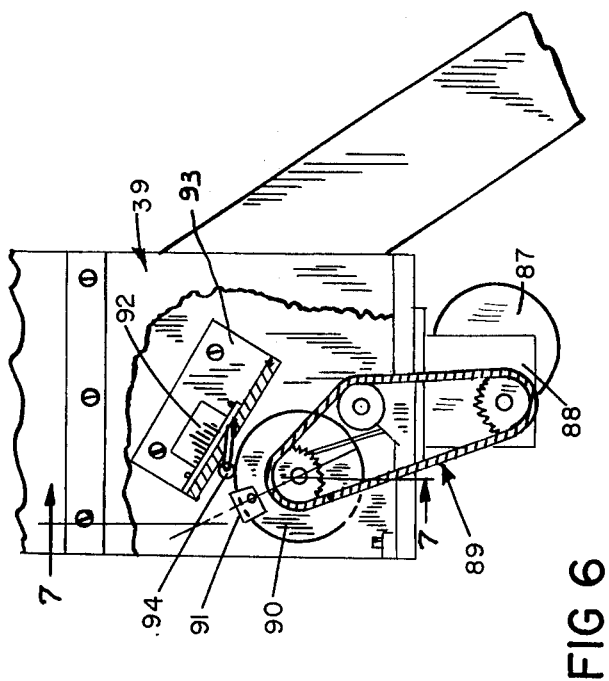
FIG. 6 is an end view of a cam programmer control mechanism for controlling various portions of operation of the invention.
Figure 8:
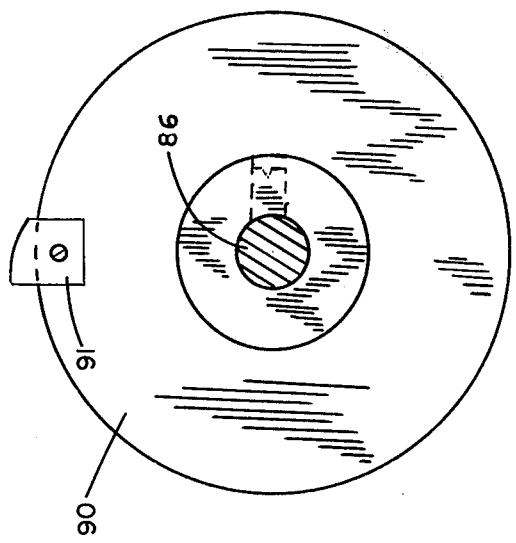
FIG. 8 is a sectional view taken as on line 8—8 in FIG. 7.

A mechanical programming control for operating of the drill heads of the various functions of the machine is shown in FIGS. 6 and 7. The programmer housing 39 has suitable bearing supports at opposite ends for rotatably mounting a shaft 86, and the shaft 86 is driven from a motor 87. The motor 87 drives a gear reducer set 88, and in turn drives the shaft 86 through a chain and sprocket 89. The shaft 86 has mounted thereon a plurality of discs indicated generally at 90 that are drivably mounted on the shaft and can be adjusted for axial spacing with a set screw or similar device and slid axially along the shaft. Each of the discs 90 has at least one cam member or dog indicated generally at 91 mounted thereon. The cam members 91 are saddle shaped members or U shaped members that fit over the edge of the disc 90 and which are held in place with a suitable set screw around the periphery of the disc at any desired rotational location. The cam discs are positioned to align with one of a plurality of micro switches indicated generally at 92 that are supported on a switch support 93 adjacent the periphery of the discs 90. As can be seen, the micro switches 92 have actuators 94 which clear the periphery of the discs, but which are in position so that they will be intercepted by the cam members or dogs 91. When a cam dog is rotated past its associated micro switch, the dog will actuate the micro switch and cause some action to be taken in a desired program. The switches may be opened or closed, as desired, by the cam dogs. There are a plurality of these discs 90 spaced along the shaft 86, and although they are only shown schematically for illustrative purposes, there would be one of these discs for controlling each function in the program. As will be explained the discs and cam dogs in cooperation with the controlled switches are used to initiate movement of the drill heads into forward motion for drilling and for other control and checking functions, such as starting the index in action by energizing the clutch 67A for the index drive. The cam dogs are easily rotated to desired programmed positions relative to each other and many discs can be placed on the shaft. Additionally, an entire shaft and disc assembly can be removed from the housing 39 by disconnecting the chain drive and removing the bearing caps. The shaft, with the discs and cam dogs positioned as desired can be stored without disturbing the program on the shaft and then replaced in the housing when the part to which the program relates is again being made.

Figure 5:
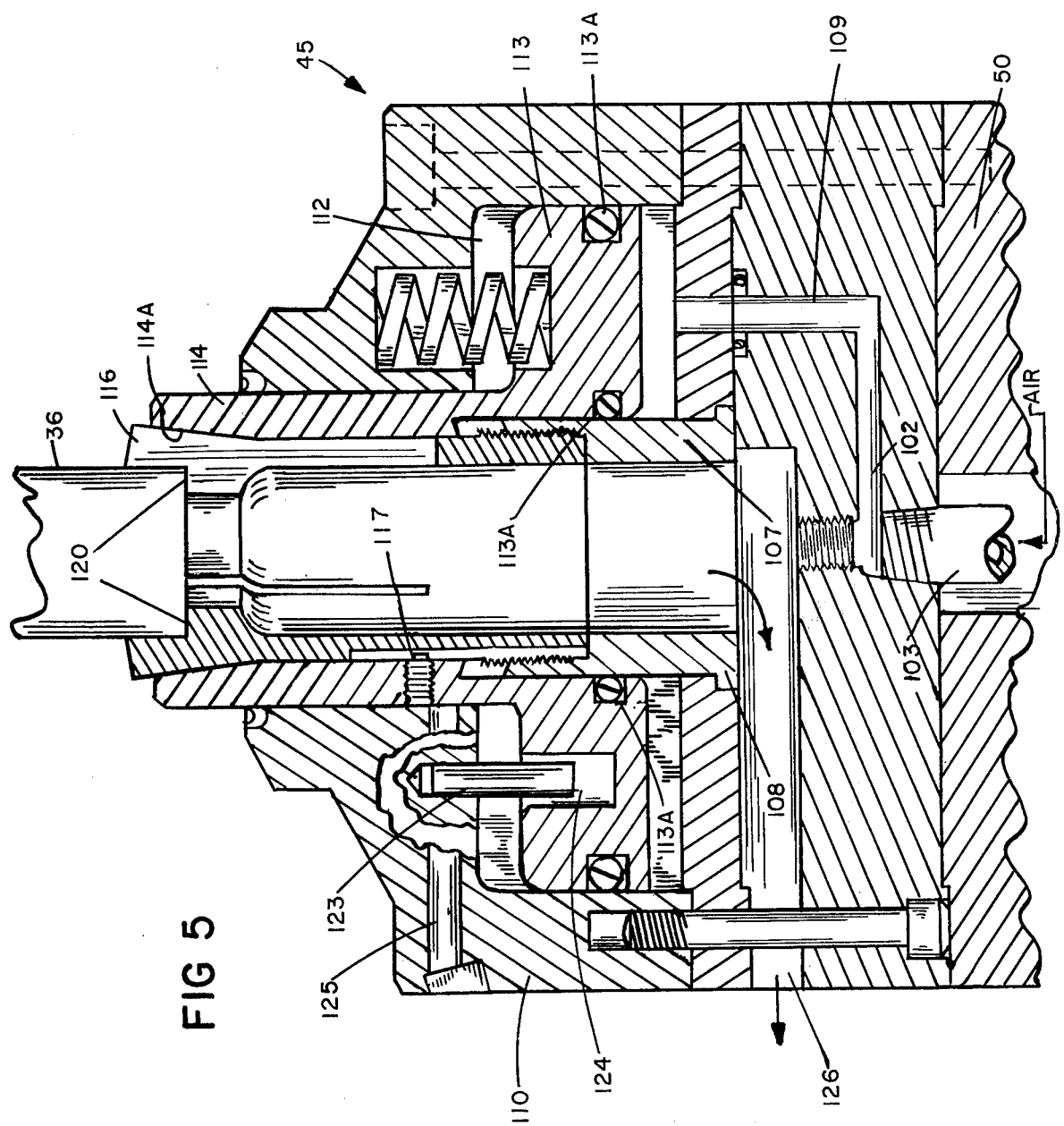
FIG. 5 is a sectional view taken vertically through the chuck showing a part in position in a collet, and showing the chuck in an actuated position clamping the part.

Referring now specifically to FIG. 5, an important feature is shown, and this is the type of a collar or clamping mechanism which will not move the part after the part has been positioned in the collet itself. As shown, the collect mechanism illustrated generally at 45 has a base 100 that is fixedly mounted onto the rotating head 50 of the shaft with suitable cap screws, and it should be also seen that this base 100 has a passageway 102 therein to which an air supply pipe 103 is fastened, and the air supply pipe 103 passes down through the hollow center of the shaft 48, to a rotary coupling 104 (see FIG. 2) which leads to a suitable source of air under pressure for operating the chuck. Base 100 mounts a mounting block 106 that is fixed to the base, and the block clamps a collet mounting member 107 to the base 100. The collet mounting member 107 is held securely by a flange 108 so that it is held in a recess in block 106 and thus held tightly with respect to the base 100. The block 106 with a passageway that aligns with a passageway 109 leading from pipe 103.

A piston housing 110 is clamped to the block 106 and the housing includes a guide neck 111. The piston housing has a large cylinder opening 112 adjacent the block 106, into which a piston 113 is slidably mounted. The piston is attached to a movable, tubular actuator 114 and which passes through a provided opening in the neck 111. Suitable seals are provided to prevent leakage of fluid where necessary, and it can be seen that O rings 113A are used for sealing the piston with respect to the interim walls of chamber 112 and with respect to the mounting member 107, which is positioned through an opening in the center of the piston 113. The mounting member 107 is slidably mounted with respect to the piston 113. A piece part clamp member 116 is threaded into the mounting member 107 as shown and is seated firmly with respect thereto so that there is a rigid connection between the clamp 116 and the base 100, and therefore there is a good solid connection with respect to the table 11 through the shaft mounting for the shaft 48. The clamp 116 as shown has jaws which are forced inwardly to grip the part 36 by interaction of tapered surfaces on the outside of the jaws and an actuating surface 114A of the actuator 114. The clamp 116 has a shoulder 120 machined therein to positively seat the part 36 in a fixed relationship with respect to the table 11, and therefore with respect to the drilling heads mounted on the table 11 so that the part 36 is precisely located from the top of the table 111 when it is mounted against the shoulder 120. This fixed distance is repeatable for different parts. The threaded mounting of the clamp 116 does not change, and thus the vertical distance between shoulder 120 and the base 11 does not change and the part 36 is precisely located.

Return springs 122 can be utilized which operate against the piston 113 to return it back toward the base 100, so that the piston 113 becomes a single acting piston. A guide pin 123 is mounted in the piston housing 110, and extends into a provided recess 124 in the piston member 113 at the top thereof to prevent the piston member from rotating substantially with respect to the base. A pressure relief passageway 125 is also provided so that when the piston is actuated in an upwardly direction air on the top side of the piston can escape. The passageway 125 also permits access to a lock screw 117 which prevents the clamp 116 from turning and coming out of adjustment. A passageway 126 is for outward coolant flow.

The chuck is actuated by moving the piston 113 upwardly as indicated by the arrow 126, by subjecting the piston to air under pressure through passageways 102 and 109. The part 36 is clamped by the jaws of clamp 116, which as shown are split to permit clamping movement without moving the part 36. The piston 113 can be actuated by a suitable solenoid valve 105 to move the piston to the position shown, to clamp the part tightly by tightening the clamp 116 down onto the part. It should be noted that the shoulder 120 does not shift axially, the part is accurately centered by the tapered surface 114A on the actuator member 114. The tapered surfaces, of course, are well known for clamping chucks.

The important point is that in chucking the part 36 the part 36 does not move in its axial direction with respect to the table 11, but once it is positioned in place on the shoulder 120 it is held accurately as to its vertical distance.

Figure 9:
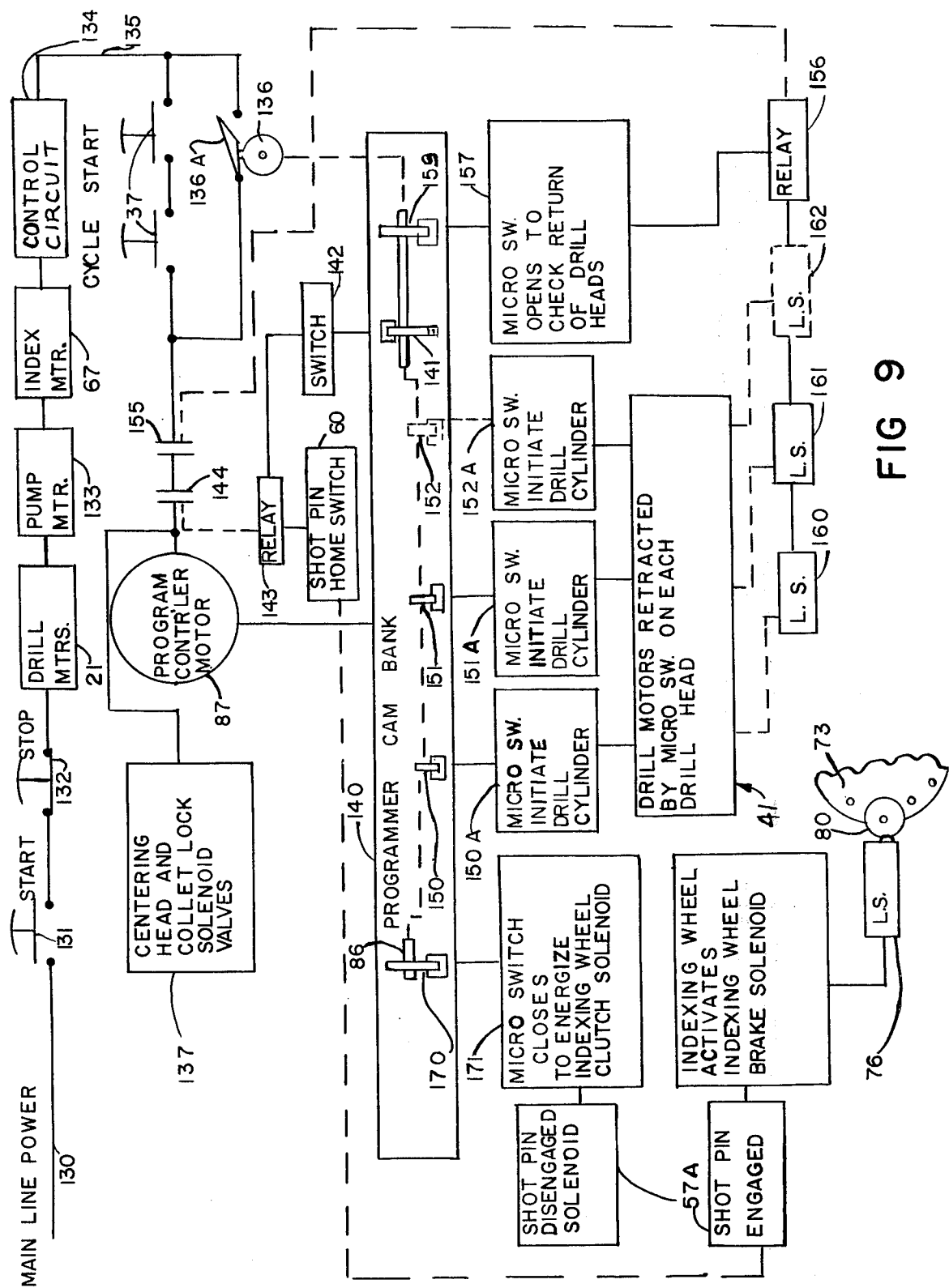
FIG. 9 is a schematic representation of a typical electrical circuit in simplified form used in the control of the present invention.

Referring to FIG. 9, when the machine is to be run, power is supplied along a main power line 130, through a main start switch 131, which energizes the unit, and a normally closed stop switch 132 can also be provided, if desired. The power actuates all of the drill head motors 21 in parallel for each of the stations 18 that is in use, and also actuates the pump motor 133 for coolant oil that is used. In addition, the indexing motor 67 is energized by the main power switch, and continues to run at all times. The positioning of the indexing wheel is controlled by the clutch 67A and brake 67B on this motor. Further, power is supplied to the control circuitry power supply and this is indicated by box 134. The power can be a low voltage control power source as desired. The control circuit provides a voltage along the line 135. The double switches 37 shown in FIG. 1 are also shown schematically in FIG. 9. When these switches 37 are both depressed, they will complete a circuit to a program controller motor 87, assuming that the contacts 144 and 155 shown in the line to the motor are closed, which is the normal situation. The contacts 144 are closed when the shot pin is in its home position holding the dial plate, and contacts 155 are closed by a set of contacts during most of the cycle of the program as will be explained, and will be closed if all the drills are retracted fully. Power will drive the shaft 86, as previously explained, and will rotate the cam discs 90 that are used in the program. A specific cam 136 will be rotated to close a switch 136A (this switch 136A is one of the bank micro switches shown generally at 92) to electrically bypass the switches 37 and keep the program controller motor 87 energized until the cam 136 for switch 136A has rotated a full revolution and again opens the micro switch 136A (assuming the contacts 144 or 155 do not open).

At the same time that the programming controller motor 87 is energized, the solenoid valve for the centering head and drill bushing support cylinder, and the solenoid valve controlling air to the chuck locking piston, or in other words the valve 105 (see FIG. 2) controlling air to the tube 103 will be energized and the chuck lock will be activated to push on the piston 113 forcing the locking member 114 against the clamp member 116 to tightly clamp the part 36. These solenoid valves are shown schematically in one box at 137. The valves for these cylinders are of the type that will activate the cylinders to working position and when the solenoids are relaxed the cylinders are relieved of pressure and returned in opposite direction (retracted).

The programming controller motor 87 drives the shaft 86 for the programmer cam bank shown generally at 140, and it is to be understood that the cam discs are then rotating.

Figure 10:
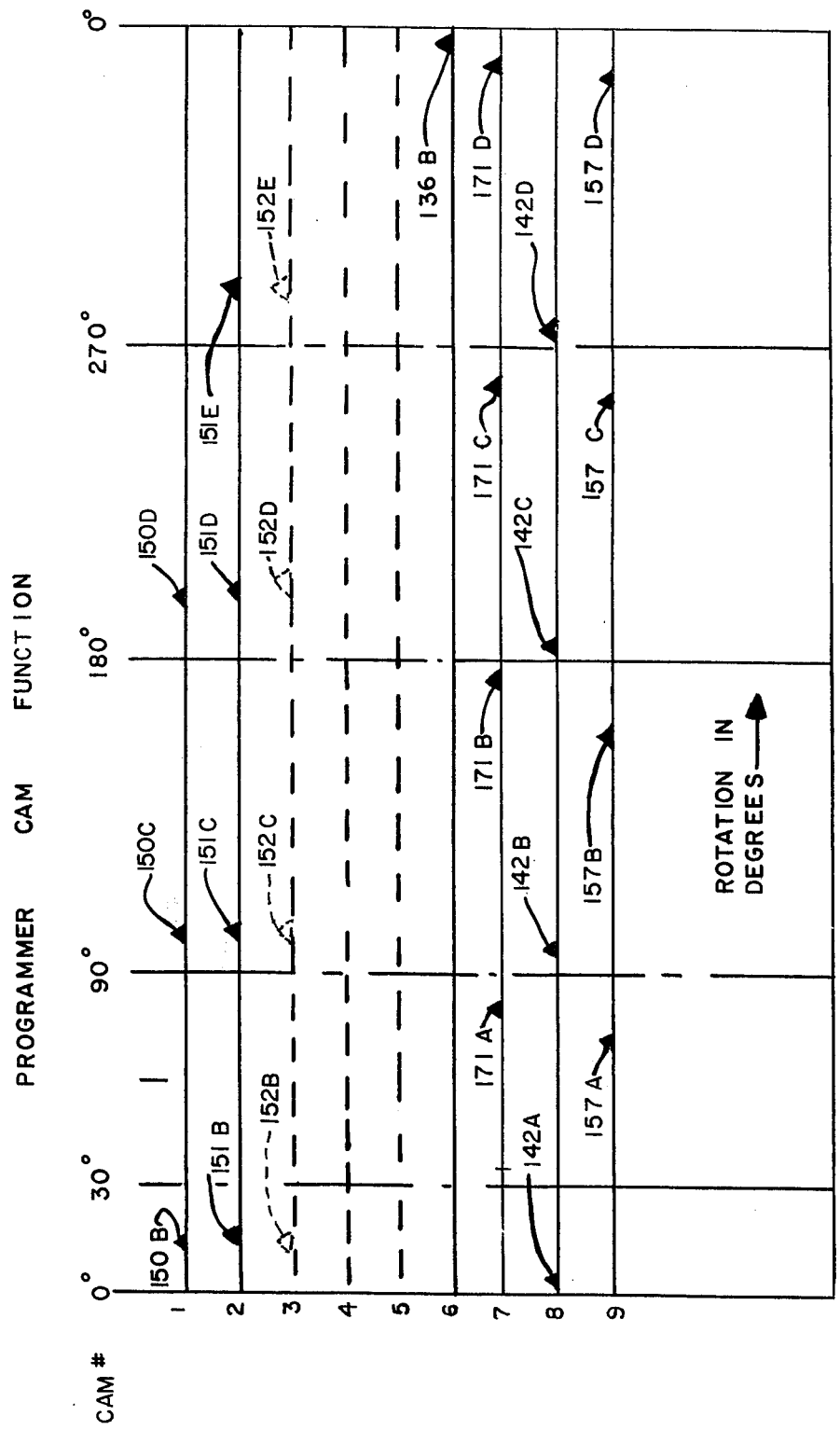
FIG. 10 is a schematic representation of a cycle of operation of the programming control for the machine of the present invention.

In a timing cycle layout shown in FIG. 10, the 360° of rotation of shaft 86 is represented in flat layout and the action of the cams is represented on the horizontal lines with the dark arrow heads representing a cam dog 91 actuating a switch 92. In a rotational cycle a cam represented along line 8 shows that the first operation is that a cam, for example, a cam disc shown schematically at 141 in FIG. 9 will open a switch 142 to break a circuit to a relay 143 (as represented at mark 142A), and this relay in turn controls contacts 144 which are in the circuit to the motor 87. The relay 143 is also energized by the shot pin home limit switch 60, so that if the shot pin is "home" the contacts 144 will remain closed even though the switch 142 opens. The opening of switch 142 is a check to make sure that the shot pin is home. After the cam 141 is rotated a short distance the actuator on the disc 141 will release the switch 142 so that it will close to complete a separate circuit to the relay 143 so that the contacts will remain closed while the cam rotates even if the shot pin is retracted for an indexing operation.

Then, as shown, suitable discs 150 and 151, and additional discs for additional drilling heads such as the one shown at 152 will be driven from the shaft 86 and will control separate drill head cylinders 19. In the sequence illustrated each of the discs will carry four of the cam actuators 91 that will each close micro switches indicated at 150A, 151A and 152A to initiate the respective drill head cylinders 19. In FIG. 10, the timing relationship is illustrated by arrowheads on lines 1 and 2 at 150B and 151B respectively. The solenoid valves are operated to extend the drill spindles toward the work piece. Drill motors 21 will be running, so that the drills will then enter the bushing housing on the centering head, and the part 36 will have been held by the chuck lock. The drilling action is then controlled by limit switches 41 and the actuators 40, so that when the drills reach the end of the strokes, the limit switches 41 will be closed and the retract position of the valves controlling the cylinders 19 will be initiated so that the cylinders will then retract. This is represented only by a box indicating the action, and is conventionally done with usual solenoid valves.

During operation of the programmer a relay 156 is normally energized through micro switch 157 controlled by a cam 158 and represented in FIG. 10 on cam line 9. This micro switch 157 is normally closed, and so the relay 156 is energized when the shaft 86 is rotating except at preselected times when the cam actuator will open the switch 157 momentarily, as represented by the raised arrowheads or triangles on line 9 of FIG. 10. The relay 156 is also energized separately (in parallel with switch 157) by series connected limit switches indicated at 160, 161 and 162 (if three heads are used), which are separate series connected limit switches for each drill head connected from a power source and which are closed when the respective drill heads are retracted fully so that they are back out of the drill bushing cover. When all drill heads are retracted fully, the relay 156 will be independently energized, and as the cam shaft assembly continues to rotate as driven by the motor 87 the cam disc 158 carrying the cam member will open the switch 157 at the time indicated at 157A, in the FIG. 10 timing diagram, and if any of the limit switches 160 and 161 (or 162) are not closed indicating that all the drill heads are not fully retracted the motor 87 will be stopped by opening of contacts 155 until the limit switches all close and the relay 156 is energized through the switches. This is to insure that the drill heads are fully retracted before any indexing action occurs. Assuming that the relay 156 is energized even when the switch 157 is open, an indexing cam indicated generally at 170 in FIG. 9, which has four separate dogs 91 for the operation shown where there would be four indexings of the part during each cycle, closes a micro switch 171 at the time represented at 171A in FIG. 10, and this will momentarily control a micro switch that initiates or energizes an indexing wheel clutch solenoid for energizing the clutch 67A between the motor 67 and the gear box 66. At the same time, this micro switch energizes the valve 57A to retract the cylinder 57 and pull the shot pin 58 out of the dial plate 52 so that the part can be indexed. Switch 142 is closed to energize relay 143 and keep contacts 144 closed during indexing. Then, when the clutch 67A engages fully index control plate 73 and also the shaft 48 and chuck will be rotated until the next indexing plate cam disc 80 contacts the limit switch 76 to energize the brake solenoid control and disengage the clutch and shot pin solenoid valve 57A. The valve 57A is such that when the valve is not energized it returns to position to move the cylinder 57 to extend and force the shot pin back into its home position. The air pressure from the air source remains applied to the cylinder 57 to hold the shot pin home.

Then the first drilling and indexing cycle will have been completed slightly before shaft 86 has rotated 90°, and the part will have been indexed by the timing belt or timing means 64 operating from the same motor 67 that the solenoid operates from, the brake 67B will hold the gear box from rotation, and the shot pin will be engaging an aligned opening 54 of the dial plate 52.

In order to again check to make sure that the shot pin is engaged, the cam 141 will open the switch 142, at the time indicated at 142A in FIG. 10 (after 90° of rotation), and if the shot pin switch 60 is closed the relay 143 will continue to be energized even if switch 142 is opened and contacts 144 will remain closed and the programmer will continue to operate. If, however, the shot pin is not properly home, the contacts 144 would be opened because the relay 143 would no longer be energized and this would result in the stopping of the programming controller and also initiate a warning light or some other similar indicator of malfunction. If the shot pin is just slow in reaching its home position, the unit would again start up when the switch 60 was closed, after the shot pin had reached its home position to insure that the dial plate, shaft 48 and part 36 are positively held in the proper indexed position. Then, initiation of the drilling cycle would repeat as indicated at 150C, 151C and 152C by the operation of cam dogs from the cams 150, 151 and 152.

The programmer would continue to operate and, as shown, two more indexing operations take place. If desired, as shown, the cam 150 would not have to have an actuator 91 for operating the micro witch 150A at the fourth drilling position (shortly after the 270° line in FIG. 10), but the cam 151 could have a dog to operate the micro switch 151A and this would then be indicated 151E to indicate that only this particular drill head would be operated at this time, and the other drill head would remain retracted.

A final indexing indicated 171D would take place when the cam 170 had almost reached its home position, and the cam 136 for operating the micro switch 136A would open the switch 136A at the point indicated at 136B to stop the program. The shaft 86 would have completed one complete revolution. The solenoids indicated at 137 would be deenergized so that the centering and bushing holder for the collet would release, (the valves used cause return when deenergized) and also the chuck actuator will be released so that the part 36 that had been processed could be removed and a new part put in. Then when the operator was again ready to start, the switches 37 would be pushed to repeat the cycle.

By changing the location of the cam dogs 91 on different cam discs 90, the point during the rotation of the cam shaft at which the various actions will occur can be changed. While only two drill heads are shown, as many drill heads as can be mounted on the mounting plate 11 can be used. There are eight stations used, and each of the eight stations will have a separate cam control.

Thus, a chuck which clamps the part without moving the part from a fixed shoulder used for locating the part for precise positioning provides for accurate repeatable operations, and a programmer that provides flexibility of programming at low cost, insure uses in a wide variety of operation.

Also, the positive holding action and indexing action provided with the indexing controller and dial plate permits accurate indexing that can easily be changed merely by placing donut or washer cam actuators over selected pegs on a rotating programmer to change the amount of rotation of the part during indexing.

The various components such as the chuck and indexing controller and the programmer may be used in many operations for controlling various actions.

If the only action that is to be taken on a part is a single operation, for example, simply extending and retracting the drill heads, the programmer can be stopped, and the chuck and the drill heads operated manually (by manual switches) if desired. No indexing would be necessary.

What is claimed is:
1. An indexing control for controlling operations on an indexed part movable about an axis including a base, means to rotatably mount said part on said base for rotary indexing motion about a preselected axis, an indexing control, synchronizing drive means driving said indexing control and said means rotatably mounting said part, means to initiate said drive means at preselected times, control means controlled by said indexing control separate from said means to initiate said drive means, said indexing control comprising a rotatable member having cam support means positioned at a plurality of locations about the axis thereof for removably mounting cam means, cam means mounted on at least one of said cam support means on said rotatable member, said control means including an actuator positioned with respect to said base at a location so cam means positioned on said rotatable member engages the actuator at a desired rotational position as the rotatable member is rotating to provide a signal indicating a rotational position of said means rotatably mounting said part which is correlated precisely with the rotational position of said part through said synchronizing drive means.

2. The combination of claim 1 and means to disable said drive means to stop said means to rotatably support said part, said means to stop being separate from said means to initiate said drive means, means to connect said actuator to said means to stop to disable said drive means when said cam means reaches a preselected position and actuates said actuator.

3. The combination as specified in claim 1 wherein said rotatable member comprises a plate member, and said cam support means comprise a plurality of pegs extending substantially parallel to the axis of rotation of said plate member and spaced from said axis adjacent the periphery thereof, and said cam means comprise means removably mounted on said pegs to engage said actuator as said plate member rotates, said pegs being clear of the path of said actuator when said cam means are removed.

4. The combination as specified in claim 3 wherein said synchronizing drive means comprises a motor, a timing belt member drivably mounted between said motor and said means rotatably mounting said part.

5. The combination of claim 2 and a plate member fixed to rotate with said means rotatably mounting said part, a plurality of cooperating releasable lock means between said base and said plate member adjacent the periphery of said plate member, said lock means being positioned around said plate member at intervals corresponding to the intervals of said means for removably mounting cam means on said rotatable member of said indexing control, and means to release said lock means whenever said drive means is initiated, and to lock said lock means whenever said drive means is disabled by said means to disable.

* * * * *